Dec. 23, 1958  F. B. HALFORD ET AL  2,865,442
FUEL SUPPLY SYSTEMS FOR LIQUID FUEL ENGINES
Filed July 23, 1954  2 Sheets-Sheet 2

Inventors
FRANK B. HALFORD
PETER CROSSLAND
By
Holcombe, Wetherill & Brisebois
Attorneys

United States Patent Office 2,865,442
Patented Dec. 23, 1958

2,865,442

FUEL SUPPLY SYSTEMS FOR LIQUID FUEL ENGINES

Frank Bernard Halford, Edgware, and Peter Crossland, Hemel Hempstead, England, assignors to The De Havilland Engine Company Limited, Leavesden, England, a British company Application July 23, 1954, Serial No. 445,334

Claims priority, application Great Britain July 29, 1953

2 Claims. (Cl. 158—36.3)

This invention relates to fuel supply systems for liquid fuel engines, of the type comprising means for feeding the fuel, at a relatively low pressure, through a filter to a pump which delivers the fuel at a relatively high pressure to a discharge device such as a burner.

The invention is concerned with fuel supply systems intended for use where there is a risk of freezing of the fuel, or water contained therein, for instance in aircraft. The risk of freezing is greater in the filter, where the fuel is relatively slow moving and where frozen particles may be caught by the filter due to its fine mesh, than in other parts in the system. It is an object of this invention to provide such a fuel supply system which can be operated so as to reduce the risk of freezing.

According to the invention, in a fuel supply system of the type specified provision is made for tapping off some of the fuel delivered by the pump, passing it through a pressure reducing device, and recirculating it through the filter.

Some of the work done on the recirculating fuel is converted into heat, and the combined heating and sluicing effects of the fuel passing through the filter help to prevent freezing therein, and also tends to remove any frozen matter which may already have accumulated in the filter. The heating effect also serves to limit the rise in viscosity, which occurs at low temperatures, of certain fuels such as diesel oil.

The heat generated is not only useful in the filter, since the warm fuel will also tend to remove accumulations of ice or other frozen particles from other parts of the system, for instance on the high pressure side of the pump and in any of the fine channels of the control gear or burners, and to maintain the fluidity of the fuel in these parts. In certain circumstances the additional heat may benefit the spray of fuel from the burners, improving atomisation and assisting combustion.

If desired, some of the tapped off fuel may be diverted to a part of the fuel system, other than the filter, in which there is also a risk of freezing or of the fuel becoming too viscous.

In most cases conditions conducive to freezing will not be experienced all the time, and therefore the provision for recirculating the fuel may be in the nature of an adjunct to a conventional fuel supply system, which can be brought into operation when required while at other times the fuel system will work in its ordinary manner.

In certain conventional fuel supply systems intended primarily for aircraft engines there is at least one fuel pump (usually two or more) of the variable delivery type whose delivery is varied as a function of one or more variables, such as barometric pressure. The fuel delivered by the pump is usually subjected to further metering in a control unit. The metering of the fuel in the control unit will usually be influenced in dependence on the setting of the pilot's throttle lever, and it may also be influenced by other variables. When the present invention is applied to such a system provision should be made for overriding the influences which normally control the delivery of the fuel pump and for setting the pump to deliver the full quantity of fuel, the said pressure reducing device comprising a pressure-sensitive valve adapted to open when the pump delivery exceeds requirements. Thus the actual quantity of fuel supplied to the engine is determined solely by the control unit and the surplus fuel delivered by the pump is automatically recirculated through the filter. The pump should be arranged, when the recirculation system is functioning, to deliver against substantial back pressure, which may be in excess of the normal fuel pump delivery pressure.

In one form of the invention the fuel filter is provided with nozzles directed towards the filter elements and through which at least some of the recirculating fuel is passed so that jets of recirculated fuel impinge with a flushing action on to the filter element.

As indicated above, the recirculating system will usually only be brought into operation when conditions are such as to make its use desirable. For this purpose there may be provided an indicating or control device sensitive to a rise in the pressure drop across the filter such as occurs on the incidence of freezing or of a rise in the fuel viscosity in the filter. For instance, the device which is sensitive to a rise in the pressure drop across the filter may be coupled with control mechanism for the pump so that the tapping off and recirculation of the fuel comes into operation automatically on the incidence of freezing or of a rise in fuel viscosity in the filter.

One specific embodiment of the invention, as applied to a fuel supply system for an aircraft engine, will now be described by way of example with reference to the accompanying drawings, in which.

Figure 1:
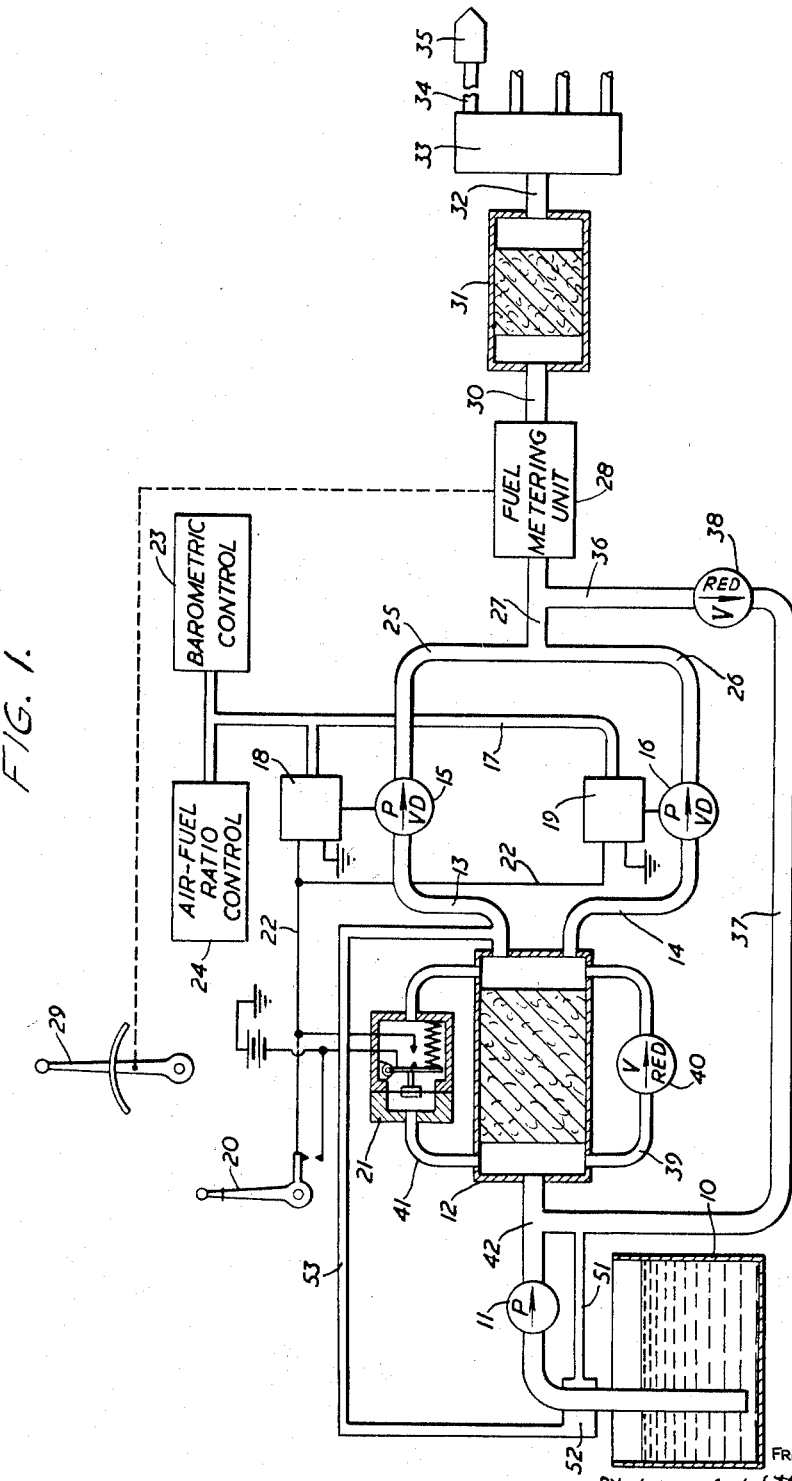
Figure 1 is a diagram of the fuel supply system.

In the fuel system shown in a simplified diagrammatic form in the drawings the fuel is delivered from a fuel tank 10 by a low-pressure pump 11 to a low pressure fuel filter 12. At the outlet from the low pressure filter the fuel is divided into two streams in pipes 13 and 14 which pass respectively to two fuel pumps 15 and 16 arranged in parallel. These pumps are of a conventional variable delivery type each incorporating a servo control dependent on the pressure in a control pipe 17, a servo isolating valve which overrides the servo control under certain conditions as described hereinafter, and an overspeed governor which is also overriden by the servo isolating valve. The servo control, the governor and the servo isolating valve for each pump are not shown separately, and are indicated together at 18 and 19. The servo isolating valves can be actuated by a pilot's control 20 or by a pressure-sensitive device 21 referred to in more detail below. Preferably the isolating valves are electrically actuated, the electrical impulses being transmitted through connections 22. Under normal operating conditions the servo controls are actuated in dependence upon the barometric pressure through a conventional barometric pressure control 23, but they can also be actuated by a conventional air-fuel ratio control 24 arranged to override the barometric pressure control 23 during acceleration as a safeguard against temporary over-fuelling. The air-fuel ratio control 24 is inoperative at all other times.

The fuel delivery lines 25 and 26 from the fuel pumps 13 and 14 unite and pass through a common pipe 27 to a control unit 28 in which the fuel is subjected to further metering in dependence on the setting of the pilot's throttle lever 29, and in dependence upon any other variables which may be required to exert a controlling influence on the fuel supply, in a conventional manner. The metered fuel passes through a pipe 30 to a high pressure fuel filter 31 and thence through a pipe 32 to a fuel distributor 33 where it is divided into several streams each of which goes to a separate burner. For simplicity in the drawings, only one of these streams, 34, which goes to a burner 35 is shown.

A tapping 36 is provided in the fuel line between the fuel pumps 15 and 16 and the control unit 28. This tapping leads back through a pipe 37 to the inlet side of the low pressure filter 12 and includes a relief valve 38 arranged to open only when the pressure in the fuel pipe 27 attains a predetermined value exceeding that experienced in normal operation.

In order to prevent damage to the low pressure filter 12 by any momentary and excessive pressure rise in the recirculating fuel, the low pressure filter is by-passed by a pipe 39 which includes a non-return relief valve 40 which opens to permit some of the recirculating fuel to by-pass the filter 12 in the event of the pressure exceeding the value at which the valve is set to open.

Figure 2:
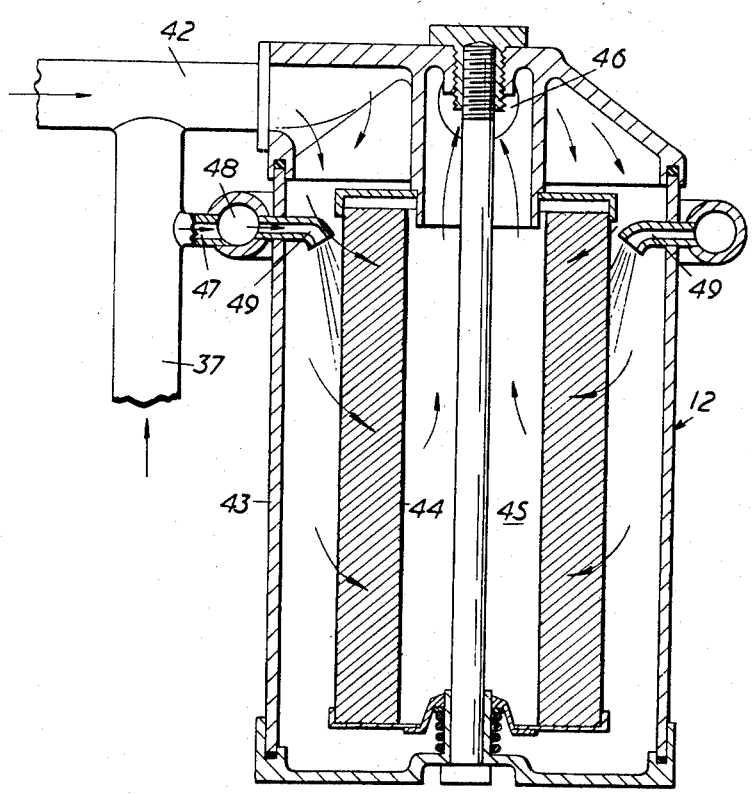
Figure 2 is a sectional elevation through the low-pressure filter.

In the form of low pressure filter 12 shown in detail in Figure 2, fuel from the low pressure fuel pump 11 enters through a pipe 42, together with most of the recirculated fuel which comes in through the pipe 37. The mixed cold and warm fuel flows down through the casing 43 of the filter around the hollow cylindrical filter element 44. The fuel passes through the walls of the filter element 44 into its hollow interior 45 and escapes through an outlet 46 into the two pipes 13 and 14 (Figure 1).

A proportion of the recirculated fuel is tapped off from the pipe 37 through a branch 47 into an annular gallery 48 around the casing 43. At intervals, nozzles 49 project into the casing 43 from the gallery 48. The inner ends of these nozzles are inclined in relation to the outer surface of the filter element 44 so that the warm recirculated fuel emerging from the nozzles 49 impinges on the outer surface of the filter element and tends to dislodge any particles of ice or frozen fuel which are adhering thereon.

The system described works as follows:

When low temperature conditions are experienced or expected, the solenoid operated servo isolating valves are actuated. These put the servo control for the fuel pumps 15 and 16 out of action and adjust the pumps to their maximum delivery. Control of the fuel delivery to the burners 35 is now exercised solely by the control unit 28 which is itself dependent upon the setting of the pilot's throttle lever 29. In this condition the pumps 15 and 16 deliver more fuel than is permitted to pass through the control unit 28 and in consequence the pressure builds up in the fuel pipe 25. As this pressure reaches the value at which the relief valve 38 is set to open, this valve opens and permits the surplus fuel to recirculate through the pipe 37 and the low pressure filter 12. Some of the work done in pumping this fuel is converted into heat which is transmitted to the low-pressure filter 12. Also, there is an added sluicing effect since more fuel is passed through the low pressure filter than would pass through it in normal operation, because not only is some of the fuel being recirculated but also the fuel pumps 15 and 16 are working at full delivery.

The rate of addition of heat to the recirculating fuel can be varied, if desired, by controlling the pressure against which the pumps work, or the quantity of fuel recirculated, or both.

Indication of adverse low temperature conditions can be given by measuring the increased drop across a critical element such as the low pressure filter, or by a change in the pressure at the inlets of the fuel pumps 15 and 16. Such pressure changes may be arranged to give a signal to the pilot of the aircraft. Alternatively, a device may be used which serves to bring the fuel recirculating system into operation automatically as required. One such automatic system is shown in Figure 1 of the drawings, in which the pressure-sensitive element 21 is incorporated in a loop 41 which is connected across the low pressure filter 12. The pressure-sensitive element 21 is arranged to actuate the servo isolating valves automatically when the pressure drop across the low-pressure filter exceeds a predetermined value. In some cases where there is risk of freezing of, or a rise in the viscosity of, the fuel in other parts of the system, as for example a part between the fuel tank 10 and the pump 11, the return flow pipe 37 may be provided with a branch as indicated at 51 by which some of the fuel is caused to circulate around the appropriate part of the system as indicated at 52 before being returned to an appropriate point in the system as by a passage indicated at 53.

What we claim as our invention and desire to secure by Letters Patent is:

1. A fuel supply system for a liquid fuel engine comprising a filter having an inlet and an outlet, means for feeding fuel at a relatively low pressure to the inlet of said filter, a high pressure fuel pump of the variable capacity type, a connection leading from the outlet of said filter to said pump, a fuel discharge device, a fuel delivery conduit leading from said pump to said discharge device, a return flow conduit leading from said delivery conduit to the inlet of said filter, control mechanism adapted to vary the capacity of said pump as a function of at least one variable influence, means for over-riding said variable influence and for setting said pump to deliver the full quantity of fuel, and a pressure-sensitive valve in said return flow conduit which is closed under normal operating conditions and is adapted to open when the pump delivery pressure exceeds by a predetermined amount the normal delivery pressure.

2. A fuel supply system according to claim 1 which also includes a control element sensitive to a difference between two pressures, connections to said pressure-sensitive control element from the inlet and from the outlet of said filter, and an operative connection between said pressure-sensitive control element and the over-riding means of said pump adapted to actuate said over-riding means automatically on the incidence of a build-up of fuel pressure across said filter.

References Cited in the file of this patent

UNITED STATES PATENTS

| | | |
|---|---|---|
| 872,437 | Leonard | Dec. 3, 1907 |
| 1,991,540 | Buchler | Feb. 19, 1935 |
| 2,405,888 | Holley | Aug. 13, 1946 |
| 2,499,494 | Greer | Mar. 7, 1950 |
| 2,552,493 | Newton | May 8, 1951 |
| 2,598,674 | Burgess | June 3, 1952 |
| 2,599,699 | Dillworth et al. | June 10, 1952 |
| 2,654,482 | Robinson et al. | Oct. 6, 1953 |
| 2,656,927 | Prendergast | Oct. 27, 1953 |
| 2,670,082 | Dunn et al. | Feb. 23, 1954 |
| 2,720,313 | Pattison | Oct. 11, 1955 |

FOREIGN PATENTS

| | | |
|---|---|---|
| 445,724 | Great Britain | Apr. 17, 1936 |